United States Patent
Ohga et al.

(10) Patent No.: US 6,644,558 B2
(45) Date of Patent: Nov. 11, 2003

(54) AUTOMATIC AIR CONDITIONER HAVING LEARNING FUNCTION AND CONTROL METHOD OF CONTROL SYSTEM

(75) Inventors: Akira Ohga, Ichinomiya (JP); Takayoshi Kawai, Hoi-gun (JP); Yoshinori Ichishi, Kariya (JP); Yuichi Kajino, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/290,895

(22) Filed: Nov. 8, 2002

(65) Prior Publication Data

US 2003/0089788 A1 May 15, 2003

(30) Foreign Application Priority Data

Nov. 12, 2001 (JP) .......................... 2001-346198

(51) Int. Cl.[7] .................................. F24F 7/00
(52) U.S. Cl. ...................... 236/49.3; 236/91 C; 62/180; 165/202
(58) Field of Search .............................. 236/49.3, 91 C; 62/178, 179, 180, 186, 244; 165/201–205, 42; 454/370, 75

(56) References Cited

U.S. PATENT DOCUMENTS 4,460,035 A * 7/1984 Mizote et al. ................. 165/12
5,511,724 A * 4/1996 Freiberger et al. .......... 236/49.3
6,454,178 B1 * 9/2002 Fusco et al. ................. 236/49.3
6,488,213 B2 * 12/2002 Ohga et al. ................. 236/49.3
2003/0051491 A1 * 3/2003 Kawai et al. .................. 62/161
2003/0066297 A1 * 4/2003 Ichishi et al. .................. 62/161

FOREIGN PATENT DOCUMENTS

| JP | 3054015 | 3/1991 |
| JP | 5208610 | 8/1993 |
| JP | 7025221 | 1/1995 |

* cited by examiner

Primary Examiner—Marc Norman
(74) Attorney, Agent, or Firm—Harness, Dickey & Pierce, PLC

(57) ABSTRACT

In a vehicle air conditioner, when a passenger manually reduces an air blowing amount in a large blowing amount area of automatic control, a correction of the blower voltage control characteristic is changed in accordance with a condition capable of determining a passenger's request. For example, as the condition, at least one of a target blowing temperature of air blown into a passenger compartment and a passed time after start of the automatic control can be used. Therefore, the corrected blower voltage control characteristic after the manual operation can be made suitable for the passenger's preference.

16 Claims, 6 Drawing Sheets

AUTOMATIC AIR CONDITIONER HAVING LEARNING FUNCTION AND CONTROL METHOD OF CONTROL SYSTEM

CROSS-REFERENCE TO RELATED APPLICATION

This application is related to and claims priority from Japanese Patent Application No. 2001-346198 filed on Nov. 12, 2001, the content of which is hereby incorporated by reference.

BACKGROUND OF THE INVENTION

1. Field of the Invention

The present invention relates to a vehicle air conditioner for automatically controlling an amount of air blown into a passenger compartment, which corrects an automatic control characteristic of the air blowing amount based on a manual operation of a passenger. More particularly, the present invention relates to a control method of a control system in the vehicle air conditioner.

2. Description of Related Art

In a vehicle air conditioner disclosed in JP-A-3-54015 or JP-A-7-25221, an air blowing amount corrected based on a manual operation of the passenger is learned, so that an automatic control characteristic of an air blowing amount is fitted to a passenger's preference. In the vehicle air conditioner disclosed in JP-A-3-54015, when an air blowing amount is manually reduced from a large blowing amount area in an automatic control, a target blowing temperature TAO at which an air blowing amount is switched from the large blowing amount area to an intermediate blowing amount area, is learned. In the vehicle air conditioner disclosed in JP-A-7-25221, when the air blowing amount is manually changed from the large blowing amount area in the automatic control, the manually changed air blowing amount is learned.

However, in the vehicle air conditioner disclosed in JP-A-3-54015, the air blowing amount in the large blowing amount area of the automatic control cannot be changed, thereby not being satisfied to the passenger's request for reducing the air blowing amount in the large blowing amount area. In the vehicle air conditioner disclosed in JP-A-7-25221, when the air blowing amount is manually reduced after the previous blowing amount is satisfied in an initial time of a cool down operation, the air blowing amount in the large blowing amount area is reduced in the automatic control. Therefore, the air blowing amount becomes deficient in the initial time of the next cool-down operation. On the other hand, when the air blowing amount is manually changed in a blowing amount control area except for the large blowing amount area, the manually-changed air blowing amount cannot be learned. Therefore, the air amount to be blown into a passenger compartment is not fitted to the passenger's preference in the blowing amount control area except for the large blowing amount area.

SUMMARY OF THE INVENTION

In view of the foregoing problems, it is an object of the present invention to provide a vehicle air conditioner which realizes comfortable control of an air blowing amount by correcting a blowing amount control characteristic in automatic control based on manual operation of a passenger. That is, the manual operation is learned in a control device so that the blowing amount control characteristic after the manual operation can be fitted to a passenger's preference.

It is another object of the present invention to provide a control method of a control system, which changes correction of control characteristic of the air blowing amount by effectively learning manual operation.

According to a first aspect of the present invention, in a vehicle air conditioner, an automatic control characteristic for performing an automatic control of the air blowing amount is corrected when the air blowing amount is manually changed through an operation device. The control device includes determining means for determining whether the air blowing amount is in a first area larger than a predetermined amount or in a second area smaller than the predetermined amount. Further, the control device has a condition value for determining whether a passenger wants to reduce the air blowing amount in the first area or to change a switching point at which the air blowing amount is switched between the first area and the second area. In the vehicle air conditioner, the control device changes a correction of the automatic control characteristic in accordance with the condition value when the air blowing amount is manually reduced through the operation device when the determining means determines that the air blowing amount is in the first area. Therefore, the automatic control characteristic can be fitted to a passenger's preference, thereby performing comfortable air amount control fitted to the passenger's preference.

Preferably, the automatic control characteristic has a first control portion in the first area and a second control portion in the second area, the control device changes the correction of the automatic control characteristic to correct the first control portion when the condition value satisfies a predetermined condition in a relationship with a threshold value stored in the control device, and the control device changes the correction of the automatic control characteristic to correct the second control portion when the condition value does not satisfy the predetermined condition in the relationship with the threshold value. Further, the condition value can be at least one of an air temperature in the passenger compartment, a target blowing temperature of air to be blown into the passenger compartment, a passed time from a start of automatic control operation, an estimated value of a passenger's thermal feeling, and a skin temperature of the passenger. Accordingly, the manual operation can be effectively learned so that the blowing amount control characteristic after the manual operation can be fitted to the passenger's preference.

When the air blowing amount is increased by the operation device to be equal to or more than the predetermined amount in the first area from the second area, the control device corrects both the first control portion and the second control portion in the automatic control characteristic. Therefore, both the first control portion and the second control portion can be learned in accordance with the passenger's preference.

More preferably, the second area includes a low blowing amount area, and an intermediate blowing amount area where the air blowing amount is between the low blowing amount area and the first area. In this case, when the control device corrects the second control portion, the control device corrects at least one of the switching point at which the air blowing amount is switched between the first area and the intermediate blowing amount area, a change ratio of the air blowing amount in the intermediate blowing amount area, and the air blowing amount in the low blowing amount area. Accordingly, even in the low blowing amount area, the passenger's preference manual operation can be effectively learned.

On the other hand, in a control method of a control system for a vehicle air conditioner, it is determined whether the air blowing amount at a start time of manual change is in the first area when the air blowing amount is manually changed. Further, in learning of the control method, the air blowing amount in the first area is reduced when the temperature relative to the inside air temperature is lower than a predetermined temperature when the air blowing amount is manually reduced in the first area and a condition value is in a first state. Further, in the learning, the air blowing amount in the second area is reduced when the air blowing amount is manually reduced in the first area when the condition value is in a second state. Accordingly, the control method of the control system changes the correction of the control characteristic of the air blowing amount by effectively learning manual operation.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
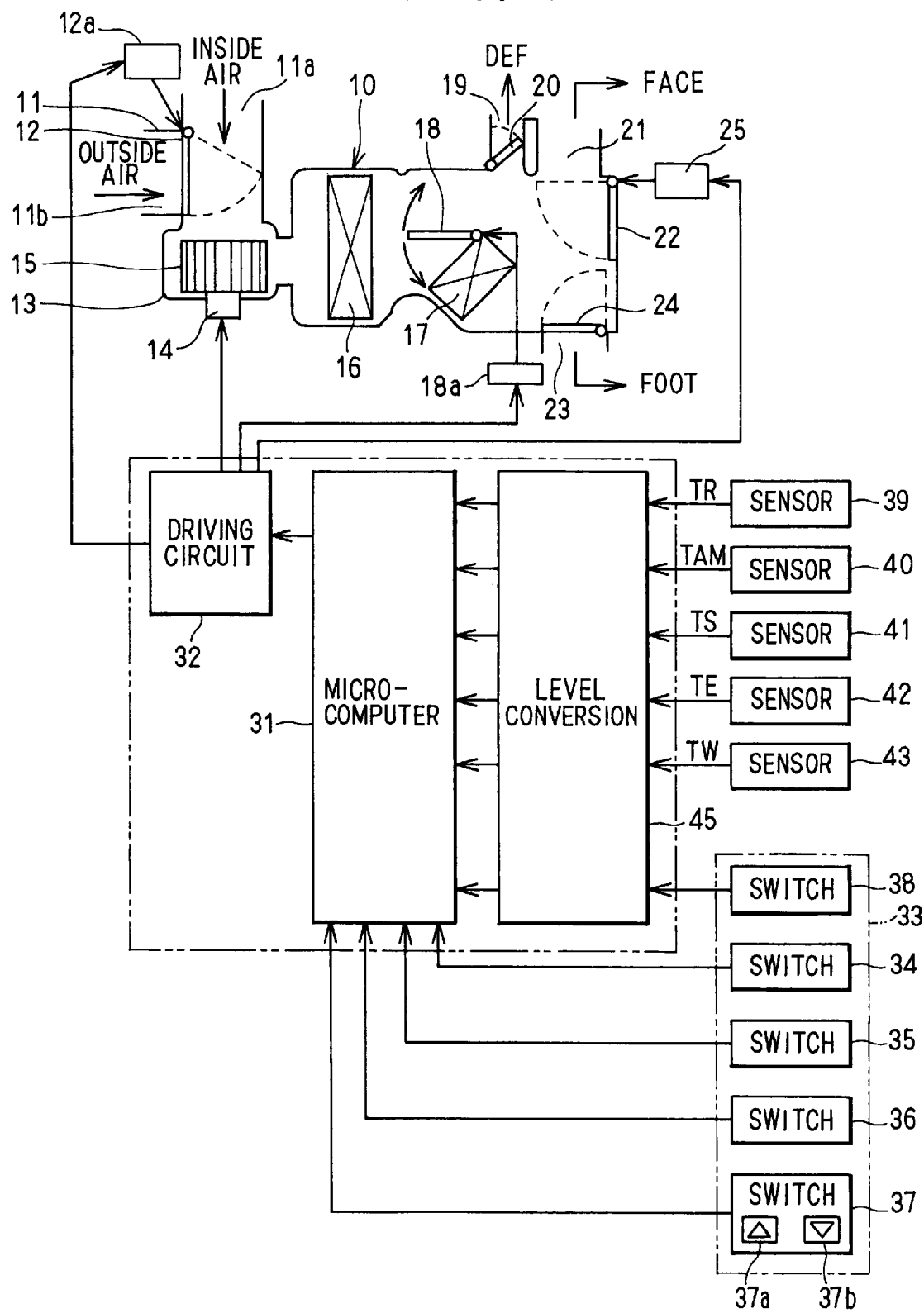
FIG. 1 is a schematic diagram showing an entire system of a vehicle air conditioner according to a first embodiment of the present invention.

A vehicle air conditioner of FIG. 1 according to the first embodiment automatically controls an air blowing temperature, an air blowing amount, an air inlet mode (air introduction mode), an air outlet mode and the like by automatically controlling air-conditioning control components based on stored control characteristics. Further, the vehicle air conditioner corrects the stored control characteristics for automatic control, based on a passenger's introduction such as manual operation of a passenger. The vehicle air conditioner includes an air conditioning unit 10 used as an interior unit, an inside-outside air switching box 11 used as an air-inlet mode switching device at the most upstream air side of the air conditioning unit 10, and the like. The air conditioning unit 10 is disposed inside a passenger compartment of the vehicle. The switching box 11 includes an outside introduction port 11*b*, an inside air introduction port 11*a* and an inside-outside air switching door 12. The inside-outside air switching door 12 is rotatably disposed in the inside-outside air switching box 11 at a branch point between the ports 11*a*, 11*b*, and is driven by an actuator 12*a*. The inside-outside air switching door 12 switches the air introduction of inside air and outside air into the air conditioning unit 10, or is disposed to adjust a mixing ratio of inside air to outside air.

A blower 13, for introducing air into the inside-outside air switching box 11 and for blowing the introduced air to a downstream side of the air conditioning unit 10, is disposed at a downstream side of the inside-outside air switching box 11. The blower 13 includes a blower motor 14 and a centrifugal blower fan 15 connected to a rotational shaft of the blower motor 14. An evaporator 16 and a heater core 17 are provided at a downstream side of the blower fan 15. The evaporator 16 is a cooling heat exchanger, and constructs a refrigerant cycle together with a compressor driven by a vehicle engine, and the like. In the evaporator 16, refrigerant flowing therein absorbs heat from air to be evaporated, so that the air is cooled. Cooling water (hot water) from a vehicle engine (not shown) is circulated into the heater core 17 as a heating heat exchanger, and air is heated by the cooling water as a heat source. An air mixing door (A/M door) 18 as an air-temperature adjusting device is rotatably provided at an upstream side of the heater core 17. An open degree of the A/M door 18 is adjusted by an actuator 18*a*. Thus, an amount ratio of air passing through the heater core 17 to air bypassing the heater core 17 is adjusted, and the temperature of air to be blown into the passenger compartment is adjusted.

A defroster (DEF) door 20 for opening and closing a DEF air port 19, a face door 22 for opening and closing a face air port 21, a foot door 24 for opening and closing a foot air port 23 are provided at the most downstream side of the air conditioning unit 10. The doors 20, 22, 24 as air-outlet mode switching devices are driven by an actuator 25, and any one of air outlet modes such as a face mode, a B/L (bi-level) mode, a foot mode, a F/D (foot-defroster) mode and a DEF mode is set. Temperature-adjusted air (conditioned air) is blown into the passenger compartment from at least one opened air port corresponding to a set air outlet mode.

An air-conditioning control unit 30 includes a microcomputer 31 as a control device. A voltage applied to the blower motor 14 is adjusted based on a signal output from the microcomputer 31 through a driving circuit 32, to adjust a rotational speed of the blower motor 14. An air blowing amount from the blower 13 is controlled by the rotational speed of the blower motor 14. Further, the other actuators 12*a*, 18*a*, 25 are also controlled based on signals output from the microcomputer 31 through the driving circuit 32. The microcomputer 31 includes a central processing unit (CPU), a read only memory (ROM), a random access memory (RAM), a stand-by RAM, an input output port (I/O port), an analog-digital conversion circuit (A/D conversion circuit) and the like (they are not shown). The stand-by RAM is a RAM for storing (performing a backup of) values learned as passenger's preferences even when an ignition switch (IG) is turned off, and is directly energized by a battery not through IG even when IG is turned off. Further, a backup power source is provided, for energizing the microcomputer 31 for a short time after electrical connection between the microcomputer 31 and the battery is broken.

Operation signals are input to the microcomputer 31 from an operation portion 33 provided on a dashboard in the passenger compartment. The operation portion 33 includes an automatic switch 34, an inside-outside air selecting switch 35, an air outlet mode selecting switch 36, an air amount setting switch 37, an air temperature setting switch 38 and the like. The automatic switch 34 is for setting an automatic control state, and the inside-outside air selecting switch 35 is for manually switching the air inlet mode between an inside air introduction mode and an outside air introduction mode. The air outlet mode selecting switch 36 is for manually switching the air outlet mode, and the air-amount setting switch 37 is for manually switching the air blowing amount. The air temperature setting switch 38 is for manually setting the air blowing temperature into the passenger compartment. The air-amount setting switch 37 includes a blowing-amount up switch 37a and a blowing-amount down switch 37b. The blowing-amount up switch 37a outputs a signal for increasing the voltage applied to the blower motor 14 (blower voltage) by one level (0.25V) when being pushed by one time. The blowing-amount down switch 37b outputs a signal for reducing the blower voltage by one level (0.25V) when being pushed by one time.

Sensor signals are input to the microcomputer 31 from various sensors for detecting environmental conditions such as air-conditioning loads affecting to an air-conditioning state. Specifically, the sensor signals are input to the microcomputer 31 through a level conversion circuit 45 from an inside temperature sensor 39, an outside temperature sensor 40, a sunlight sensor 41 and a post evaporator temperature sensor 42, a water temperature sensor 43 and the like. The sensor signals from the sensors 39–43 are analog-digital converted (A/D converted) in the microcomputer 31, and are input to the microcomputer 31. The inside temperature sensor 39 is for detecting an inside air temperature TR (air temperature inside the passenger compartment), and the outside temperature sensor 40 is for detecting an outside air temperature TAM (air temperature outside the passenger compartment). The sunlight sensor 41 is for detecting a sunlight amount TS entering into the passenger compartment, and the post evaporator temperature sensor 42 is for detecting an evaporator temperature TE (temperature of air flowing out from the evaporator 16). The water temperature sensor 43 is for detecting a water temperature TW (temperature of engine cooling water circulated into the heater core 17). Further, an operation signal from the temperature setting switch 38 is level-converted by the level conversion circuit 45, and is input to the microcomputer 31.

Figure 2:
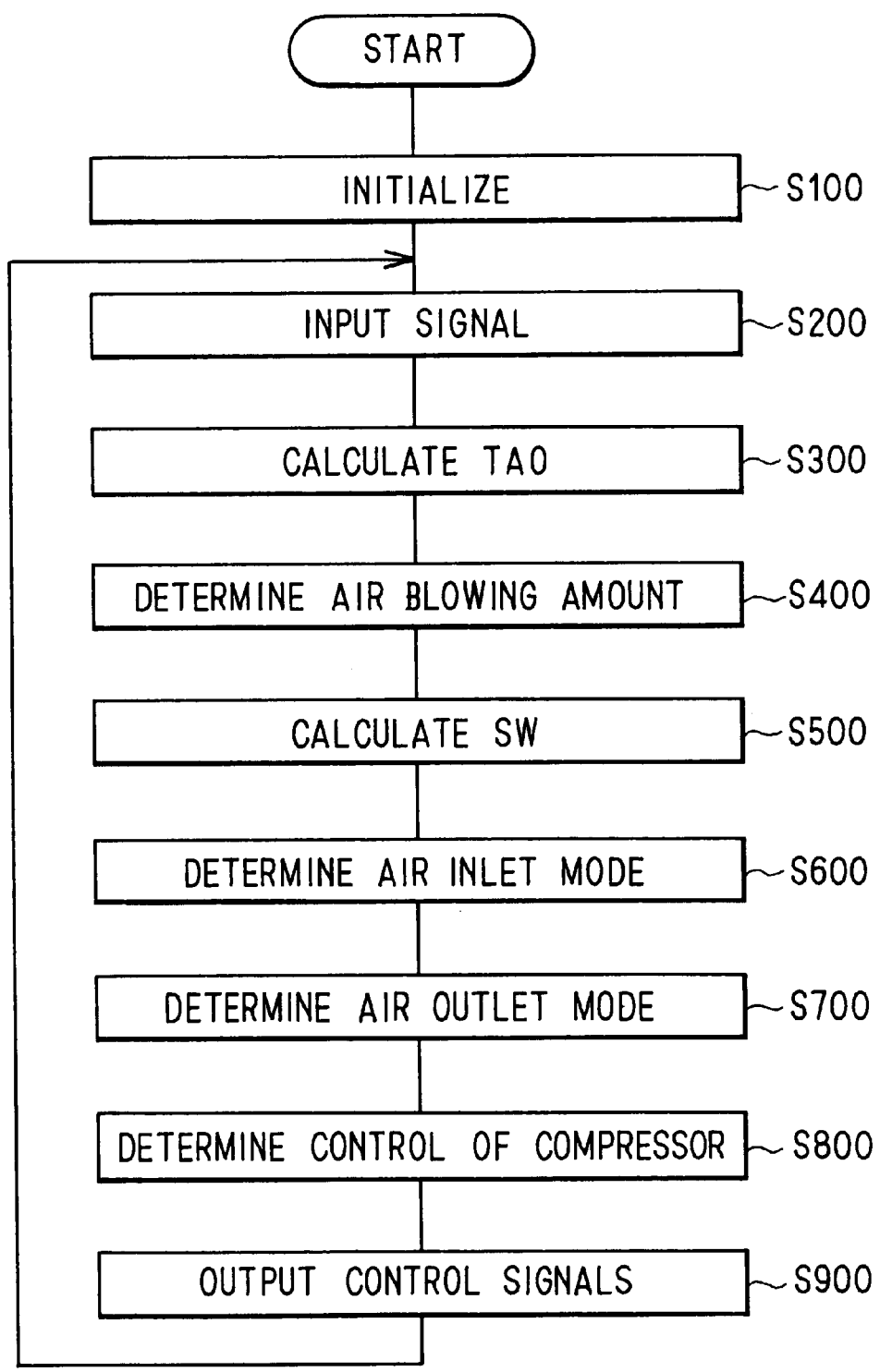
FIG. 2 is a flow diagram showing air-conditioning control of the vehicle air conditioner according to the first embodiment.

FIG. 2 shows a basic control operation of the vehicle air conditioner in automatic control. The microcomputer 31 starts the automatic control after the IG is turned on. At step S100, each of conversion values, flags and the likes is initialized. At step S200, the operation signals and the sensor signals are input to the microcomputer 31 from the operation switches 34–38 and the sensors 39–43. At step S300, a target blowing temperature TAO of air blown into the passenger compartment is calculated by the following formula (1) based on a set temperature TSET and sensor signals input at step S200.

$$TAO = KSET \times TSET - KR \times TR - KAM \times TAM - KS \times TS + C \qquad (1)$$

wherein, KSET, KR, KAM and KS are coefficients, and C is a constant. TSET is the inside air temperature set by the temperature setting switch 38, and TR is the inside air temperature detected by the inside temperature sensor 39. TAM is the outside air temperature detected by the outside temperature sensor 40. TS is the sunlight amount entering into the passenger compartment detected by the sunlight sensor 41. TAO is the air blowing temperature for maintaining an air temperature in the passenger compartment at the set temperature TSET regardless of changes of the environmental conditions.

At step S400, the blower voltage for determining the air blowing amount is determined based on the target blowing temperature TAO. However, since a desired air blowing amount is changed for every passenger, it is difficult to uniformly determine the desired air blowing amount for every passenger. In the first embodiment, a blower voltage calculation map (i.e., air amount control characteristic) is corrected based on the manual operation of the passenger, thereby learning the passenger's preference. This content will be specifically described later. Then, at step S500, an open degree SW of the A/M door 18 is calculated based on the target blowing temperature TAO, the evaporator temperature TE and the water temperature TW. At step S600, an air introduction ratio between the inside air amount and the outside air amount using the switching door 12 is calculated based on the target blowing temperature TAO. At step S700, the air outlet mode using the doors 20, 22, 24 is determined based on the target blowing temperature TAO. At step S800, a control characteristic of the compressor is determined so that the evaporator temperature TE is maintained at a target evaporator temperature. At step S900, various control signals determined at steps S400–S800 are output to the blower 24, the actuators 12a, 18a, 25, and the compressor through the driving circuit 32, thereby controlling the rotational speed of the blower motor 24 and the operation of the actuators 12a, 18a, 25, and the compressor. Then, the control program is returned to step S200, and steps S200–S900 are repeated.

Next, a specific control process at step S400 shown in FIG. 2 will be described with reference to FIG. 3. At step S401, it is determined whether or not the air blowing amount is manually changed by operating the air amount setting switch 37. When the determination at step S401 is NO, that is, when it is determined that the air blowing amount is not manually changed at step S401, the blower voltage is calculated by the stored blower voltage calculation map at step S409. When the determination at step S401 is YES, that is, when it is determined that the air blowing amount is manually changed at step S401, it is determined at step S402 whether or not the air blowing amount in the large blowing amount area is in a predetermined large blowing amount area (high blower voltage level) at a start time of the air amount manual operation. When the determination at step S402 is YES, it is determined at step S403 whether or not the air blowing amount in the large blowing amount area is manually reduced. When the determination at step S403 is YES, that is, when it is determined that the air blowing amount is manually reduced at step S403, it is determined at step S404 whether or not a time shorter than a predetermined time T seconds (e.g., 60 sec.) passes after starting the automatic air-conditioning operation. That is, at step S404, it is determined whether or not the air-conditioning operation time is shorter than the predetermined time T seconds.

Figure 4A:
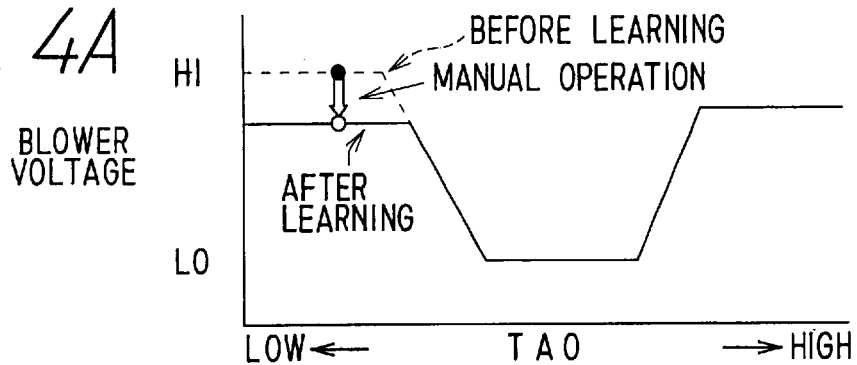
FIG. 4A is a graph showing a correction method of a blower voltage calculation map when an air blowing amount is reduced in a large blowing amount area.
Figure 4B:
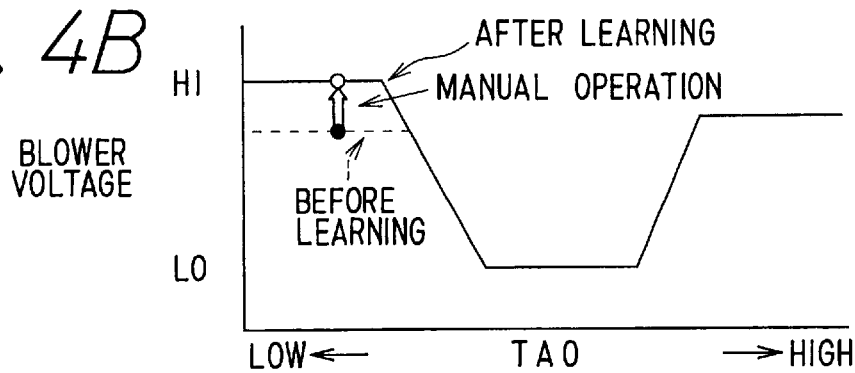
FIG. 4B is a graph showing the correction method of the blower voltage calculation map when the air blowing amount is increased in the large blowing amount area.

When all of the determinations at steps S402–S404 are YES, it can be determined that the air blowing amount in the large blowing amount area is reduced for a short time after the start of the air conditioning operation. Accordingly, in this case, it can be determined that the passenger does not prefer the air blowing amount at the time at which the manual change operation of the air blowing amount is performed. Therefore, at step S405, the blower voltage in the large blowing amount area is corrected and learned. Specifically, the air blowing amount is reduced by reducing the blower voltage in the large blowing-amount area as follows. As shown in FIG. 4A, a control pattern before learning, shown by a broken line, is changed to a control pattern after learning shown by a solid line. Then, at step S409, the blower voltage is calculated by the blower voltage calculation map after learning. When the determination at step S403 is NO, it is determined that the air blowing amount in the large blowing amount area is manually increased. Therefore, at step S405, the air blowing amount is corrected to be increased by increasing the blower voltage in the large blowing-amount area (high blower voltage level) as follows. As shown in FIG. 4B, a control pattern before learning, shown by a broken line, is changed to a control pattern after learning shown by a solid line. Then, at step S409, the blower voltage is calculated by the blower voltage calculation map after learning.

Figure 4C:
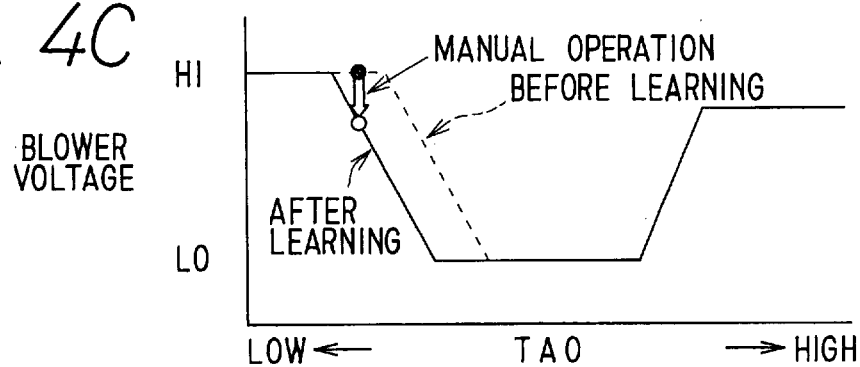
FIG. 4C is a graph showing the correction method of the blower voltage calculation map when the air blowing amount is reduced in an intermediate blowing amount area.

When the determination at step S402 is NO, it is determined at step S406 whether or not the air blowing amount is manually changed to be larger than the predetermined amount in the large blowing-amount area after the manual operation of the air blowing amount. When the determination at step S406 is NO, that is, when it is determined that the air blowing amount is manually changed to be smaller than the predetermined amount in the large blowing-amount area after the manual operation of the air blowing amount, the control pattern is learned only in an intermediate blowing amount area at step S407. Then, at step S409, the blower voltage is calculated by the blower voltage calculation map after learning. When the determination at step S404 is NO, that is, when it is determined at step S404 that the A/C operation time is longer than the predetermined time T after the start of the automatic air-conditioning operation, it can be determined that the air blowing amount is manually reduced in a case where the previous air blowing amount is satisfied until the air blowing amount is manually changed after the start of the automatic air-conditioning operation. Therefore, at step S407, the large blowing amount area is not learned, but only the intermediate blowing amount area is learned. Specifically, a control pattern in the intermediate blowing amount area is displaced in parallel by changing a switching point where the air blowing amount is started to be reduced from the large blowing amount area. At the switching point, the air blowing amount is changed between the large blowing amount area and the intermediate blowing amount area. As shown in FIG. 4C, a control pattern before learning, shown by a broken line, is changed to a control pattern after learning shown by a solid line. Therefore, the blowing amount after learning is made smaller than the blowing amount before learning even at the same target blowing temperature TAO. Then, at step S409, the blower voltage is calculated by the blower voltage calculation map after learning.

Figure 4D:
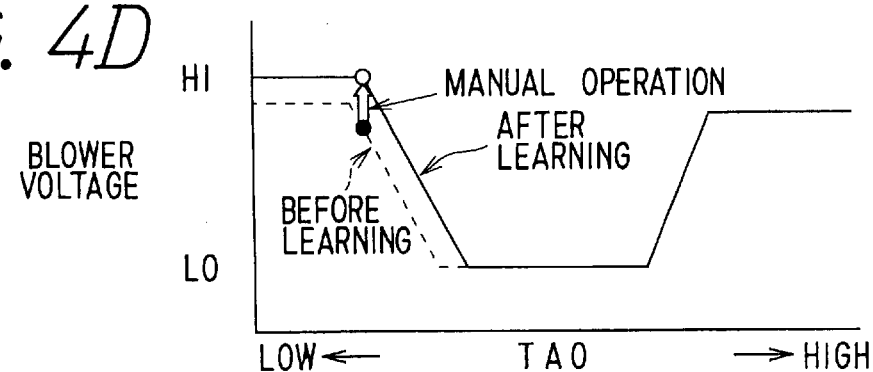
FIG. 4D is a graph showing the correction method of the blower voltage calculation map when the air blowing amount is increased in the large and intermediate blowing amount areas, according to the first embodiment.

When the determination at step S406 is YES, that is, when it is determined at step S406 that the air blowing amount is manually changed to be larger than the predetermined amount in the large blowing amount area after the manual operation of the air blowing amount, the blower voltage is increased in both of the intermediate blowing amount area and the large blowing amount area, at step S408. Specifically, as shown in FIG. 4D, a control pattern before learning, shown by a broken line, is changed to a control pattern after learning shown by a solid line. Then, at step S409, the blower voltage is calculated by the blower voltage calculation map after learning. After the control step is performed at step S409, the control program proceeds to step S500.

Figure 5A:
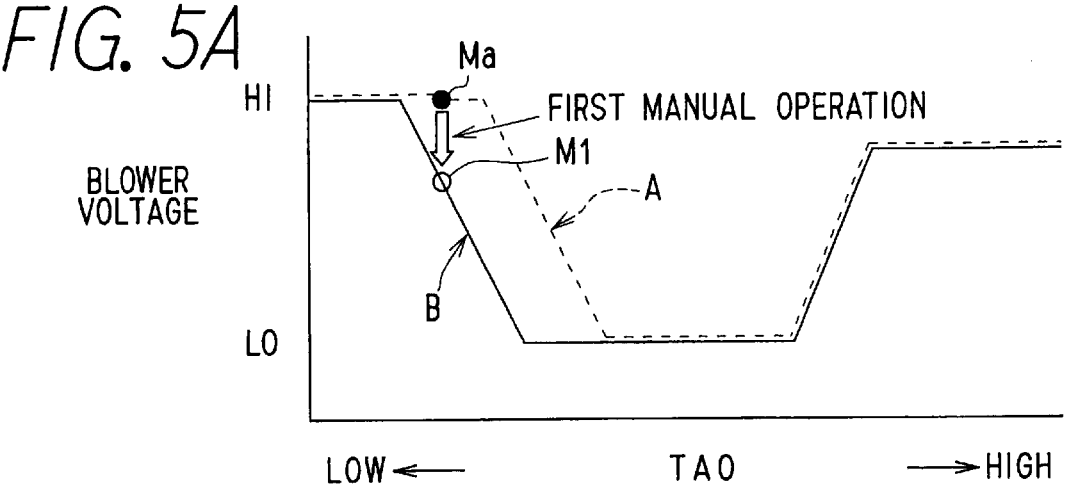
FIG. 5A is a graph showing the correction method of the blower voltage calculation map when a first blowing amount change is performed.
Figure 5B:
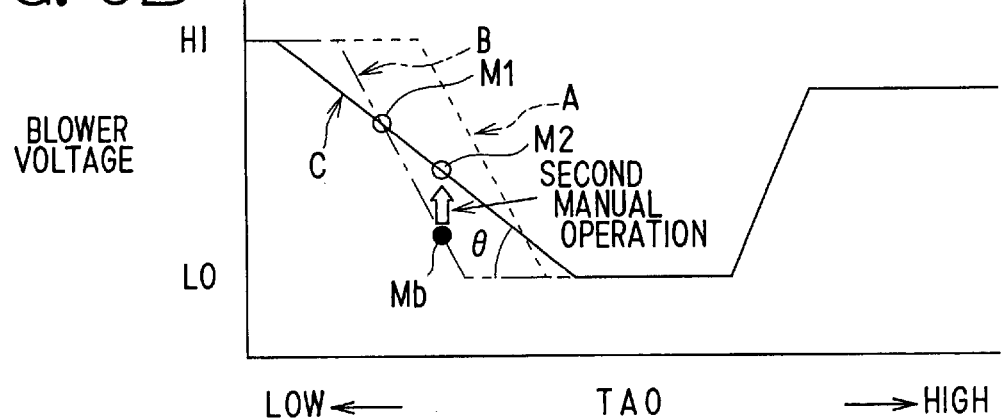
FIG. 5B is a graph showing the correction method of the blower voltage calculation map when a second blowing amount change is performed after the first blowing amount change is performed in FIG. 5A.
Figure 5C:
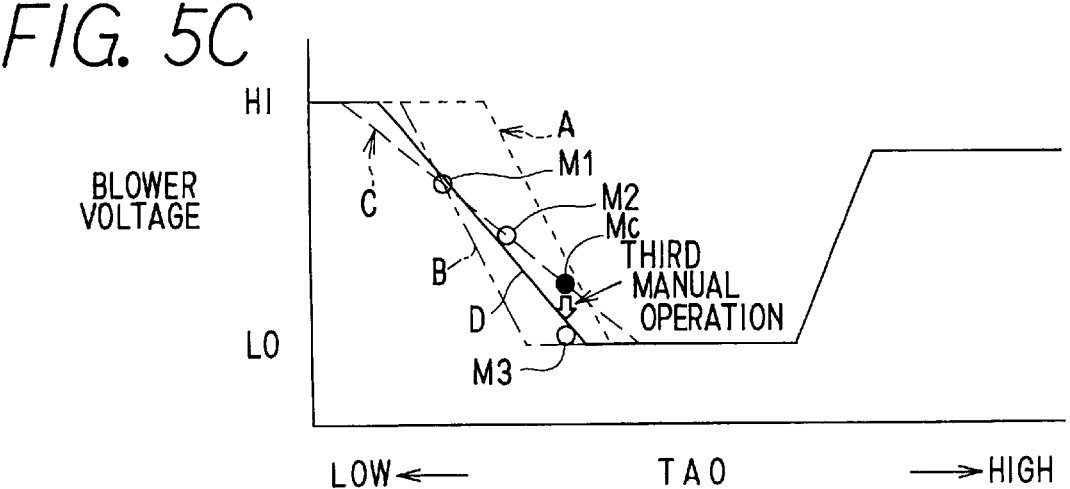
FIG. 5C is a graph showing the correction method of the blower voltage calculation map when a third blowing-amount change is performed after the first and the second blowing-amount changes are performed in FIG. 5B, according to the first embodiment.

Next, the learning operation of the blower voltage calculation map, performed when the air blowing amount is manually changed by plural times, will be described with reference to FIGS. 5A–5C. In FIG. 5A, the control pattern A indicates an original pattern which is stored in the microcomputer 31 when the vehicle air conditioner is shipped. The original pattern is beforehand set to be suitable to a general passenger's preference that is obtained by experimental studies, and is stored in the ROM in the microcomputer 31. Therefore, when no learning operation is performed for the manual operation of the air blowing amount, the blower voltage is calculated by the original pattern A shown in FIG. 5A. In the first manual operation performed by operating the blowing-amount setting switch 37, when the blower voltage is manually reduced from a maximum blowing amount Ma in the original pattern A shown in FIG. 5A to an operation point M1, the first manual operation is learned in the following manner. That is, in FIG. 5A, the intermediate blowing-amount portion of the original pattern A is displaced to a low-temperature side of the target blowing temperature TAO in parallel each other. The solid line B shown in FIG. 5A indicates a control pattern after learning the first manual operation.

In the second manual operation, when the blower voltage is manually increased from a small blowing amount Mb around the minimum blowing amount Lo in the control pattern B shown in FIG. 5B to an operation point M2, the second manual operation is learned in the following manner. That is, in FIG. 5B, an inclination angle θ of the intermediate blowing-amount portion of the control pattern B is changed so that the intermediate blowing-amount portion passes through the operation points M1, M2. The solid line C shown in FIG. 5B indicates a control pattern after learning the second manual operation.

In the third manual operation, when the blower voltage is manually reduced from a blowing amount Mc between the minimum blowing amount Lo and a blowing amount at the operation point M2 in the control pattern C shown in FIG. 5C to an operation point M3, the third manual operation is learned in the following manner. That is, in FIG. 5C, the inclination angle θ of the intermediate blowing-amount portion of the control pattern C is changed so that the intermediate blowing-amount portion is changed to a line approximated in the least square by three operation points M1–M3. The solid line D shown in FIG. 5C indicates a control pattern after learning the third manual operation. In the same manner as in the third manual operation, the inclination angle of the intermediate blowing-amount portion is changed so that the intermediate blowing-amount portion is changed to a line approximated in the least square by four or more operation points.

When the air blowing amount is manually reduced for a short time after the start of the automatic air-conditioning operation, it can be determined that the passenger does not prefer the air blowing amount at the time where the manual operation of the air blowing amount is performed. Therefore, the air blowing amount in the large blowing amount area is reduced in the blower voltage calculation map. When the air blowing amount is manually reduced after a predetermined time passes after starting the automatic air-conditioning operation, it can be determined that the air blowing amount is manually reduced in a case where the previous blowing amount is satisfied until the air blowing amount is manually changed after starting the automatic air-conditioning operation. Therefore, in the blower voltage calculation map, the air blowing amount is reduced only in the intermediate blowing amount area while the learning operation is not performed in the large blowing amount area. As in this manner, the correction method of the control pattern is changed in accordance with the passed time period until the air blowing amount is manually changed from the start of the automatic air-conditioning operation. That is, the correction method is changed in accordance with the condition which can determine whether or not the passenger wants to reduce the air blowing amount in the large blowing amount area or the passenger wants to change the switching point at which the air blowing amount is started to be reduced from the large blowing amount area. Thus, the control pattern can be made suitable for the passenger's preference, thereby performing the comfortable air-conditioning control suitable for the passenger's preference.

(Second Embodiment)

Figure 3:
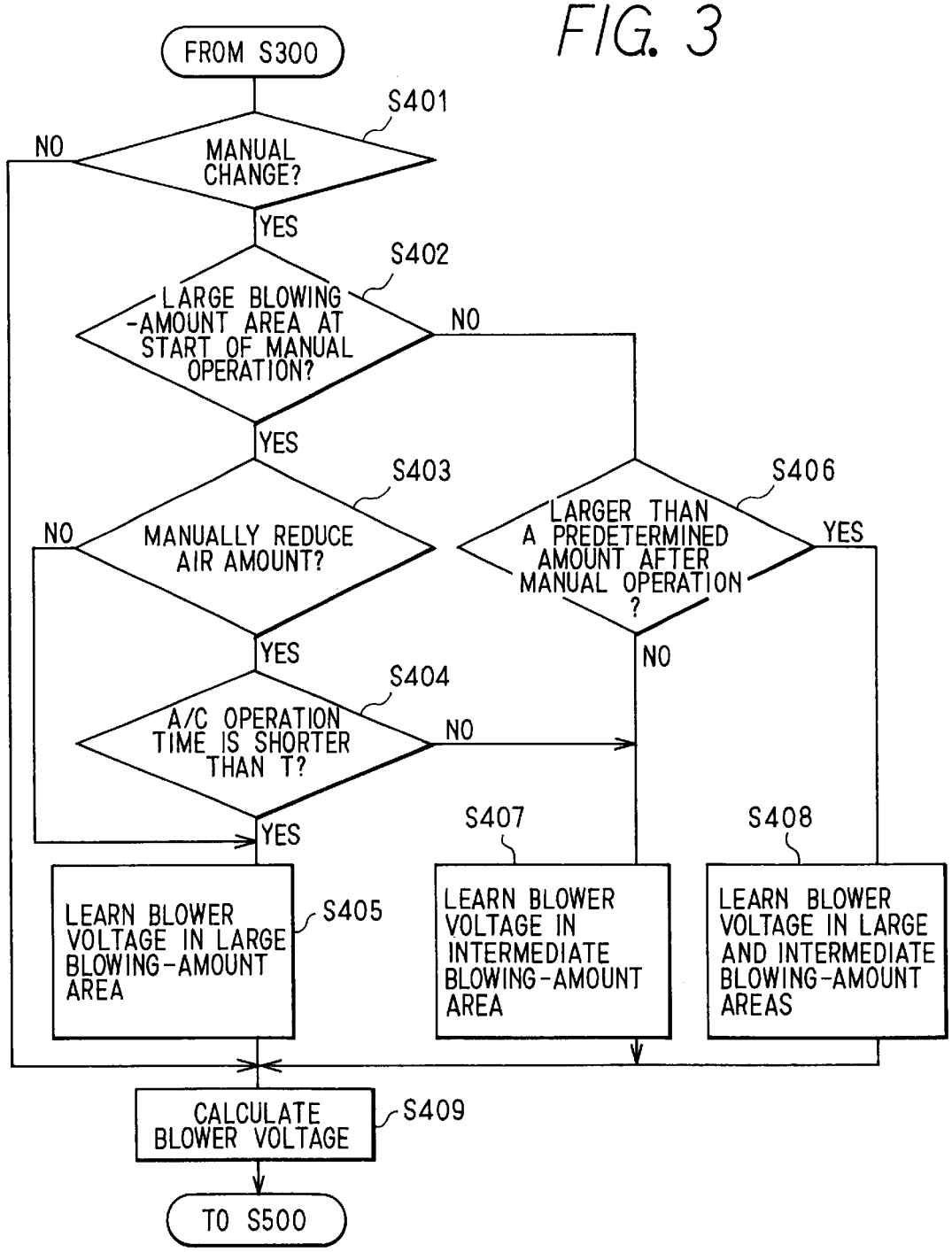
FIG. 3 is a flow diagram showing a main control of the air-conditioning control of the vehicle air conditioner according to the first embodiment.
Figure 6:
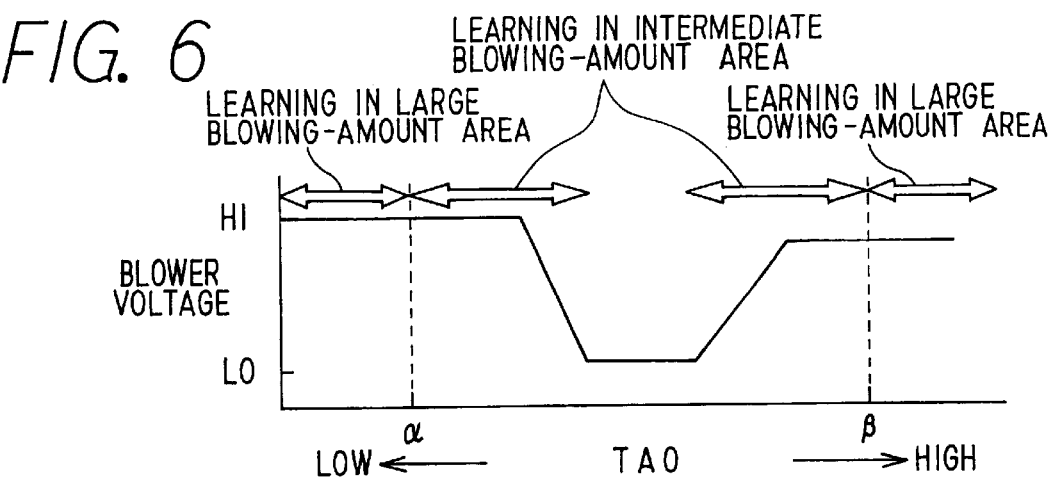
FIG. 6 is a graph showing a correction method of a blower voltage calculation map in a vehicle air conditioner according to a second embodiment of the present invention.

In the above-described first embodiment, it is determined whether or not the passed time after the start of the automatic air-conditioning operation is equal to or shorter than the predetermined time T seconds at step S404 shown in FIG. 3, and the correction method of the control pattern is changed in accordance with the passed time. However, in the second embodiment shown in FIG. 6, the correction method of the control pattern is changed in accordance with the target blowing temperature TAO at the manual operation of the air blowing amount in place of the passed time at step S404 shown in FIG. 3. Specifically, when the target blowing temperature TAO, at the manual operation for reducing the air blowing amount, is equal to or lower than α or is equal to or higher than β in FIG. 6, the air blowing amount in the large blowing amount area is reduced as shown in FIG. 4A. When the target blowing temperature TAO, at the manual operation for reducing the air blowing amount, is between α and β in FIG. 6, the air blowing amount in the intermediate blowing amount area is reduced as shown in FIG. 4C.

When the target blowing temperature TAO is lower than α, it can be determined that very high cooling capacity is required. Further, when the air blowing amount is manually reduced at this time, it can be determined that the passenger does not prefer the previous blowing amount. Similarly, when the target blowing temperature TAO is higher than β, it can be determined that very high heating capacity is required. When the air blowing amount is manually reduced at this time, it can be determined that the passenger does not prefer the previous blowing amount. Accordingly, in the second embodiment, the correction method of the control pattern is changed in accordance with the target blowing temperature TAO at the blowing-amount manual operation. Therefore, the control pattern can be made suitable for the passenger's preference, thereby performing comfortable air-conditioning control suitable for the passenger's preference.

(Third Embodiment)

Figure 7:
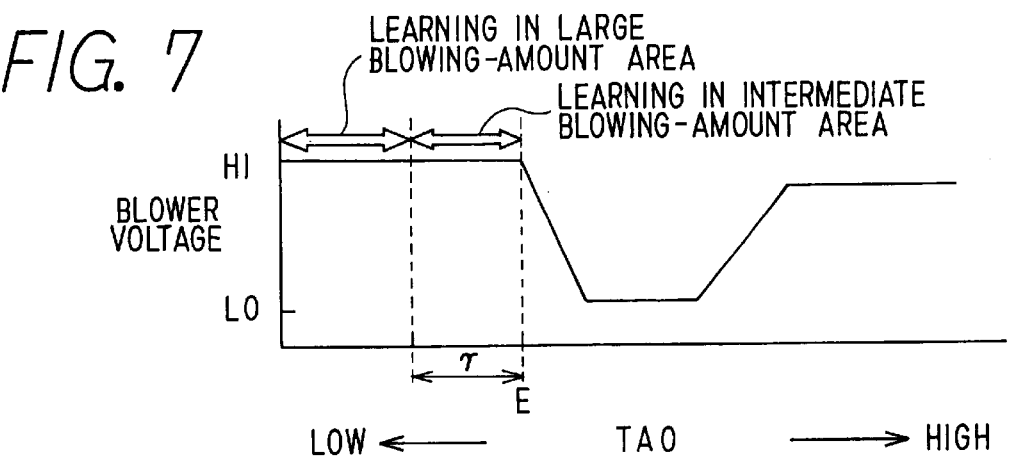
FIG. 7 is a graph showing a correction method of a blower voltage calculation map in a vehicle air conditioner according to a third embodiment of the present invention.

In the above-described second embodiment, the correction method is changed in accordance with the target blowing temperature TAO at the blowing-amount manual operation. However, in the third embodiment shown in FIG. 7, the correction method is changed in accordance with a difference of the target blowing temperature TAO. Here, the difference is between the target blowing temperature TAO at the switching point E, where the air blowing amount is started to be reduced from the large blowing amount area to the intermediate blowing amount area, and the target blowing temperature TAO at the blowing-amount manual operation. Specifically, when the air blowing amount is manually reduced in the low temperature area of the target blowing temperature TAO lower than the switching point E by a temperature difference larger than γ, the air blowing amount in the large blowing amount area is reduced as shown in FIG. 4A. When the air blowing amount is manually reduced in the low temperature area of the target blowing temperature TAO lower than the switching point E by a temperature difference smaller than γ, the air blowing amount in the intermediate blowing amount area is reduced as shown in FIG. 4C.

Therefore, the control pattern can be made suitable for the passenger's preference, thereby performing the comfortable blowing-amount control suitable for the passenger's preference. Similarly, the learning operation can be performed in the high temperature area of the target blowing temperature TAO as in the low temperature area thereof.

(Fourth Embodiment)

Figure 8:
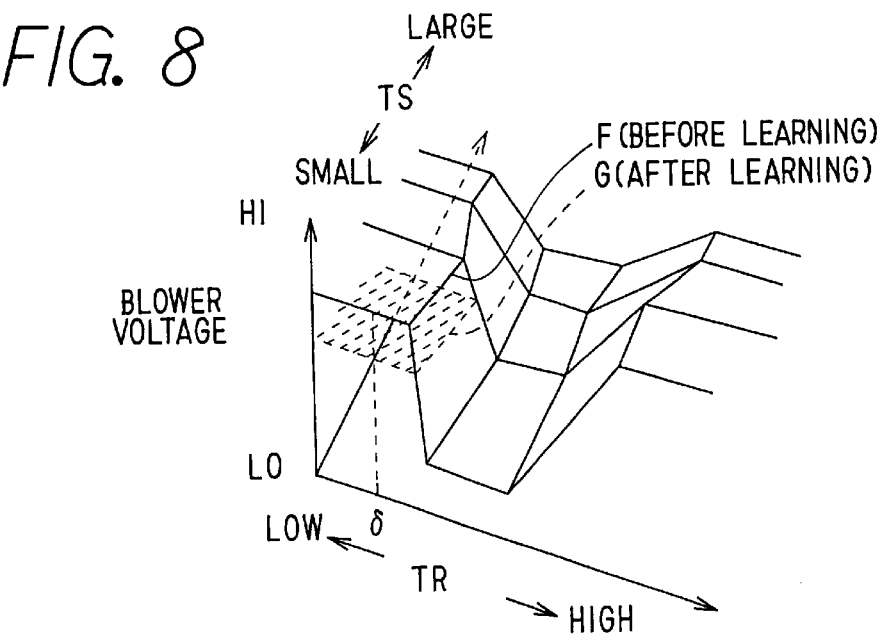
FIG. 8 is a graph showing a correction method of a blower voltage calculation map in a vehicle air conditioner according to a fourth embodiment of the present invention.

In the above-described embodiments, the blower voltage is calculated only based on the target blowing temperature TAO. However, in the fourth embodiment, the blower voltage is calculated based on the inside air temperature TR, the outside air temperature TAM and the sunlight amount TS. FIG. 8 is a three-dimensional map showing the control pattern of the blower voltage, where the blower voltage is changed in accordance with the inside air temperature TR and the sunlight amount TS in a case where the outside air temperature TAM is fixed.

In the above-described second and third embodiments, the correction method of the control pattern is changed in accordance with the target blowing temperature TAO at the blowing-amount manual operation. However, in the fourth embodiment, the correction method of the control pattern is changed in accordance with the inside air temperature TR in place of the target blowing temperature TAO. For example, when the air blowing amount is manually reduced in the low temperature area of the inside air temperature TR at a temperature equal to or lower than δ, the air blowing amount in the large blowing amount area is reduced from a pattern F before learning to a pattern G after learning, as shown in FIG. 8.

Here, the temperature feeling of the passenger is affected by the inside air temperature TR more than by the outside air temperature TAM and the sunlight amount TS. Accordingly, in cooling operation with the same target blowing temperature TAO, when the outside air temperature TAM is not so much high and the inside air temperature TR is high with respect to the set temperature TSET, the passenger feels warmer than when the outside air temperature TAM is high and the inside air temperature TR is not so much high with respect to the set temperature TSET. In this case, when the outside air temperature TAM is not so much high and the inside air temperature TR is high with respect to the set temperature TSET, the passenger wants to increase the air blowing amount in the large blowing amount area. In this case, the passenger's preference cannot be attained by the correction method changed in accordance with the target blowing temperature TAO. However, in the fourth embodiment, this passenger's preference can be attained by the correction method changed in accordance with the inside air temperature TR, thereby performing the comfortable blowing-amount control suitable for the passenger's preference. For example, when the air blowing amount is manually changed in a small amount of the sunlight amount TS, the control pattern may be learned only in the small amount area of the sunlight amount TS in FIG. 8. In the fourth embodiment, similarly to the low temperature area of the inside air temperature TR, in a high temperature area of the inside air temperature TR, the control pattern can be learned based on the inside air temperature TR.

(Fifth Embodiment)

In the above-described first embodiment, the correction method of the control pattern is changed in accordance with the passed time until the air blowing amount is manually changed after the start of the automatic air-conditioning operation. Further, in the above-described second embodiment, the correction method is changed in accordance with the target blowing temperature TAO. However, in the fifth embodiment, the air blowing amount in the large blowing amount area is changed when the passed time is equal to or shorter than the predetermined time T (seconds) and when the target blowing temperature TAO at the blowing-amount manual operation is equal to or lower than $\alpha$ or is equal to or higher than $\beta$ in FIG. 6.

For example, in the first embodiment, the air blowing amount in the large blowing amount area may be manually reduced directly after the start of the automatic air-conditioning operation. In this case, when the target blowing temperature TAO is near the switching point between the large blowing amount area and the intermediate blowing amount area, it can be determined that the passenger wants to change the switching point to the lower temperature side. However, in the first embodiment, the control pattern is corrected and learned so that the air blowing amount in the large blowing amount area is directly reduced. On the other hand, in the second embodiment, the air blowing amount in the large blowing amount area may be manually reduced after performing the automatic air-conditioning operation for a long time. In this case, when the target blowing temperature TAO is equal to or lower than $\alpha$ or is equal to or higher than $\beta$ in FIG. 6, it can be determined that the passenger may want to change the switching point to the lower temperature side. However, in the second embodiment, the control pattern is learned so that the air blowing amount in the large blowing amount area is reduced.

In the fifth embodiment, the correction method of the blower voltage calculation map is changed in accordance with the passed time after the start of the automatic air-conditioning operation, and the target blowing temperature TAO at the blowing-amount manual operation. Therefore, it can be determined more accurately whether or not the passenger wants to reduce the air blowing amount in the large blowing amount area or the passenger wants to change the switching point, thereby performing the comfortable air-conditioning control more suitable for the passenger's preference.

(Sixth Embodiment)

In the above-described first embodiment, the correction method of the control pattern is changed only in accordance with the passed time after the start of the automatic air-conditioning operation. However, in the sixth embodiment, the correction method of the control pattern is changed also in accordance with the season. A time period of automatic air-conditioning operation is shorter in the spring or the autumn than in the winter or the summer. Therefore, in the sixth embodiment, it is determined in the above embodiments whether or not it is one of the spring and the autumn, and the learning operation in the large blowing amount area can be prohibited. Accordingly, the control pattern after learning is not required to be stored in the memory in an environmental condition corresponding to the spring or the autumn, thereby saving the memory in the microcomputer 31. For example, when the outside air temperature TAM is in a range of 15–25° C., it can be determined to be any one of the spring and the autumn.

(Seventh Embodiment)

In the seventh embodiment, the threshold predetermined time T of the passed time in the first embodiment, the threshold limit temperatures $\alpha$, $\beta$ of the target blowing temperature TAO in the second embodiment and the threshold limit temperature $\delta$ of the inside air temperature TR in the fourth embodiment can be changed based on an environmental condition such as the outside air temperature TAM and the sunlight amount TS. For example, it is preferable that the threshold predetermined time T of the passed time is set shorter in a temperature range 15–25° C. of the outside air temperature TAM than in the other temperature range of the outside air temperature TAM. Specifically, the threshold predetermined time T is set at about 10 seconds in the outside air temperature TAM of 15–25° C., and is set at about 60 seconds in the other temperature area of the outside air temperature TAM. Preferably, as the sunlight amount TS in the cooling operation is increased, the threshold limit temperature $\delta$ of the inside air temperature TR in the fourth embodiment can be set lower.

(Eighth Embodiment)

In the above-described first embodiment, the correction method of the control pattern is changed in accordance with the passed time until the air blowing amount is manually changed after the start of the air-conditioning operation. However, in the eighth embodiment, the correction method of the control pattern is changed in accordance with the determination value for the passenger temperature feeling such as a skin temperature of the passenger. For example, the passenger's temperature feeling is determined by the passenger skin temperature detected by an infrared detector. The determined temperature feeling is not cool or warm, but cold or hot, and the air blowing amount is manually reduced in the large blowing amount area. At this time, it can be determined that this manual operation is performed because the passenger does not prefer the previous air blowing amount. Therefore, the learning operation is performed so that the air blowing amount in the large blowing amount area is reduced.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An air conditioner for a vehicle, comprising:
   a blower for blowing air into a passenger compartment;
   an operation device through which an air blowing amount from the blower is manually changed; and
   a control device for automatically controlling the air blowing amount in accordance with an automatic control characteristic, and for correcting the automatic control characteristic when the air blowing amount is manually changed by the operation device, wherein:

the control device includes determining means for determining whether the air blowing amount is in a first area larger than a predetermined amount or in a second area smaller than the predetermined amount;

the control device has a condition value for determining whether a passenger wants to reduce the air blowing amount in the first area or to change a switching point at which the air blowing amount is switched between the first area and the second area; and the control device changes a correction of the automatic control characteristic in accordance with the condition value when the air blowing amount is manually reduced through the operation device when the determining means determines that the air blowing amount is in the first area.

2. The air conditioner according to claim 1, wherein:

the automatic control characteristic has a first control portion in the first area and a second control portion in the second area;

the control device changes the correction of the automatic control characteristic to correct the first control portion when the condition value satisfies a predetermined condition in a relationship with a threshold value stored in the control device; and the control device changes the correction of the automatic control characteristic to correct the second control portion when the condition value does not satisfy the predetermined condition in the relationship with the threshold value.

3. The air conditioner according to claim 2, wherein the condition value is at least one of an air temperature in the passenger compartment, a target blowing temperature of air to be blown into the passenger compartment, a passed time from a start of automatic control operation, an estimated value of a passenger's thermal feeling, and a skin temperature of the passenger.

4. The air conditioner according to claim 2, wherein the threshold value is changed in accordance with an environmental condition value around the vehicle.

5. The air conditioner according to claim 2, wherein:

when the air blowing amount is increased by the operation device to be equal to or more than the predetermined amount in the first area from the second area, the control device corrects both the first control portion and the second control portion in the automatic control characteristic.

6. The air conditioner according to claim 2, wherein:

the second area includes a low blowing amount area, and an intermediate blowing amount area where the air blowing amount is between the low blowing amount area and the first area; and when the control device corrects the second control portion, the control device corrects at least one of a switching point at which the air blowing amount is switched between the first area and the intermediate blowing amount area, a change ratio of the air blowing amount in the intermediate blowing amount area, and the air blowing amount in the low blowing amount area.

7. A control method of a control system for a vehicle air conditioner, the control system being for automatically controlling an air blowing amount to be blown into a passenger compartment based on a temperature relative to an inside air temperature of the passenger compartment in any one of a first area where the air blowing amount is larger than a first predetermined amount, a second area where the air blowing amount is between the first predetermined amount and a second predetermined amount smaller than the first predetermined amount, and a third area where the air blowing amount is smaller than the second predetermined amount, the control method comprising:

storing at least a relationship between the air blowing amount and the temperature relative to the inside air temperature as a map;

reading signals from sensors and operation switches;

determining the temperature relative to the inside air temperature;

determining the air blowing amount based on the determined temperature relative to the inside air temperature, in accordance with the relationship;

determining whether the air blowing amount is manually changed when automatic control of the air blowing amount is performed;

determining whether the air blowing amount at a start time of manual change is in the first area, when the air blowing amount is manually changed;

changing and newly storing the relationship for learning such that the air blowing amount in the first area is reduced, when the temperature relative to the inside air temperature is lower than a predetermined temperature when the air blowing amount is manually reduced in the first area and a condition value is in a first state; and changing and newly storing the relationship for learning such that the air blowing amount in the second area is reduced when the air blowing amount is manually reduced in the first area when the condition value is in a second state.

8. The control method according to claim 7, wherein:

the temperature relative to the inside air temperature is an inside air temperature detected by an inside temperature sensor among the sensors.

9. The control method according to claim 7, wherein:

the temperature relative to the inside air temperature is a target blowing temperature of air to be blown into the passenger compartment; and the target blowing temperature is calculated using at least the inside air temperature detected by an inside temperature sensor among the sensors.

10. The control method according to claim 7, wherein when the condition value is in the second state, a switching point, at which the air blowing amount is switched between the first area and the second area, is reduced.

11. The control method according to claim 7, wherein:

the condition value is in the first state, when a passed time from a start of the automatic control is shorter than a predetermined time; and the condition value is in the second state, when the passed time from the start of the automatic control is longer than the predetermined time.

12. The control method according to claim 7, wherein when the air blowing amount is manually increased in the first area, the relationship is changed and newly stored such that the air blowing amount in the first area is increased.

13. The control method according to claim 7, further comprising determining whether the air blowing amount is manually changed from the second area to be larger than the air blowing amount in the first area, wherein:

in the learning, a switching point at which the air blowing amount is switched between the first area and the second area is reduced in the map, when the air blowing amount is manually changed smaller than the air blowing amount in the first area, in the automatic control with the air blowing amount in the second area; and in the learning, at least the switching point is increased, when the air blowing amount is manually changed larger than the air blowing amount in the first area, in the automatic control with the air blowing amount in the second area.

14. The control method according to claim 7, wherein:

the condition value is in the first state, when the temperature relative to the inside air temperature is equal to or lower than a first predetermined temperature, or is equal to or higher than a second predetermined temperature higher than the first predetermined temperature; and the condition value is in the second state, when the temperature relative to the inside air temperature is higher than the first predetermined temperature and is lower than the second predetermined temperature.

15. The control method according to claim 7, further comprising calculating a temperature difference between the temperature relative to the inside air temperature when the air blowing amount is manually changed, and the temperature relative to the inside air temperature at a switching point where the air blowing amount is switched between the first area and the second area; and determining whether the temperature difference is equal to or larger than a predetermined temperature difference, wherein:

when the temperature difference is equal to or larger than the predetermined temperature difference, the condition value is in the first predetermined state; and when the temperature difference is smaller than the predetermined temperature difference, the condition value is in the second state.

16. The control method according to claim 7, wherein:

the relationship is stored as the map to change the air blowing amount in accordance with the temperature relative to the inside air temperature; and the map includes a first control portion with the air blowing amount in the first area in low and high temperature ranges of the temperature relative to the inside air temperature, a second control portion with the air blowing amount in the third area between the low and high temperature ranges in the temperature relative to the inside air temperature, and a third control portion with the air blowing amount in the second area between the first area and the third area.

* * * * *